(12) United States Patent
Kärkkäinen

(10) Patent No.: US 7,094,709 B2
(45) Date of Patent: Aug. 22, 2006

(54) METHOD OF SYNTHESIZING HYBRID METAL OXIDE MATERIALS AND APPLICATIONS THEREOF

(75) Inventor: Ari Kärkkäinen, Oulu (FI)

(73) Assignee: Braggone Oy, Oulu (FI)

( * ) Notice: Subject to any disclaimer, the term of this patent is extended or adjusted under 35 U.S.C. 154(b) by 33 days.

(21) Appl. No.: 10/868,624

(22) Filed: Jun. 15, 2004

(65) Prior Publication Data

US 2005/0277274 A1    Dec. 15, 2005

(51) Int. Cl.
*H01L 21/31* (2006.01)
(52) U.S. Cl. ............... 438/780; 438/781; 438/790; 438/794
(58) Field of Classification Search ........ 438/790, 438/794, 780, 781, 782; 526/89, 95
See application file for complete search history.

(56) References Cited

U.S. PATENT DOCUMENTS 5,637,440 A    6/1997    Ogi et al. ............... 430/919
5,962,608 A *  10/1999   Ryang et al. ............ 526/89

FOREIGN PATENT DOCUMENTS

EP    0 263 428 A2    6/1997
JP    581-510    *   7/1993
JP    08 269398    10/1996

OTHER PUBLICATIONS

Copy of International Search Report for Serial No. PCT/FI2005/000280 dated Sep. 21, 2005.

* cited by examiner

*Primary Examiner*—Hsien-Ming Lee
(74) *Attorney, Agent, or Firm*—McCormick, Paulding & Huber LLP

(57) ABSTRACT

The present invention relates to metal oxide coating materials that can be used as thin film thin film coatings on various substrate surfaces. The invention also concerns a method of making metal oxide material which are stable in aqueous phase and that can be deposited on a substrate by liquid phase deposition, such as spin-on deposition. The new materials can be patterned lithographically or non-lithographically and are applicable for building up various electronic and opto-electronic device structures, such as anti-reflection layers, high-k interlayer and gate oxide structures for ICs, etch stop layer, CMP stop layer, solar cells, OLEDs packaging, optical thin film filters, optical diffractive grating applications and hybrid thin film diffractive grating structures.

35 Claims, 6 Drawing Sheets
(1 of 6 Drawing Sheet(s) Filed in Color)

METHOD OF SYNTHESIZING HYBRID METAL OXIDE MATERIALS AND APPLICATIONS THEREOF

BACKGROUND OF THE INVENTION

1. Field of the Invention

The present invention relates to metal oxide coating materials that can be used as thin film coatings and lithographically or non-lithographically patternable thin film coatings on various substrate surfaces. Furthermore, the invention concerns materials that can be used for building up various electronic and opto-electronic device structures. The invention also deals with methods of making metal oxide materials.

2. Description of Related Art

As known in the art, organo-modified silicon dioxides can be employed for forming optically transparent and electrically well insulating layers by using them as organo-siloxane polymers, also known as "sol-gel polymers". For example, in the simplest case, silicon tetraethoxide or silicon tetrachloride is hydrolysed and condensation polymerisation of the hydrolysed monomer results in a siloxane polymer that can be converted to a silicon dioxide material under thermal treatment. Furthermore, organo-siloxanes can be made lithographically patternable by attaching photocrosslinking moieties covalently to the silicon oxide backbone. A silicon oxide material based on pure silicon dioxide or even organo-modified silicon dioxides exhibit, however, a relatively low refractive index. Refractive indices of these materials are typically around 1.5 and their dielectric constants are in the range from about 4.2 to 2.5 depending on their structure and on the moieties attached to silicon. When silicon is replaced by other elements of the periodic table of elements that have a higher number of electrons, such as germanium, titanium, tin, antimony, tantalum, hafnium or zirconium, much higher refractive indices as well as dielectric constants can be obtained. However, if these metal oxides are hydrolysed and co-condensed from pure metal alkoxide or metal chloride precursors, very unstable material systems are obtained which results in a gel type and fully cross-linked (non-dissolvable) polymer after a while.

SUMMARY OF THE INVENTION

It is an aim of the present invention to eliminate at least some of the drawbacks of the prior art and to provide a method of producing a composition, which can be applied on a substrate to form a metal oxide coating material on said substrate.

It is another object of the invention to provide a coating composition, comprising stabilized monomers dissolved in an aqueous solution.

It is a third object of the invention to provide a method of forming a thin film on top of a substrate.

These and other objects, together with the advantages thereof over known methods and compositions, are achieved by the present invention as hereinafter described and claimed.

The invention is based on the idea of stabilizing the precursors of the metal oxide material used for forming a metal oxide film on a substrate by reacting them with an organic compound, which is capable of reacting with the precursor by forming a chemical compound or a chemical complex. The formed chemical complex is soluble in a low-boiling solvent, preferably in water, and can be recovered in the form of an aqueous solution. When necessary, the processing solvent can be solvent-exchanged for a solvent, with more suitable properties, such as a higher boiling point.

The invention also provides coating compositions, which comprise the reaction product between a metal oxide precursor and an organic compound, which contains at least one functional group capable of reacting with the metal element of the precursor. The composition is dissolved in a liquid, and the deposition of the material can be performed, for example, from aqueous liquid phase. However, the material can be deposited from various other processing solvents when made stable by fixing the conditions (such as pH-value of the solution) to keep the hybrid metal oxide material stable in solution.

The present compositions can be utilized in a method of forming a thin film on top of a substrate. In the method of forming a thin film, on the surface of the substrate there is applied a composition obtained by reacting a metal oxide precursor with an organic compound, which contains at least one functional group capable of reacting with the metal element of the precursor, to produce an intermediate product, which is dissolved in liquid phase and which can be polymerized.

More specifically, the method of preparing a composition is characterized by providing a precursor of the metal oxide material, containing a metal element, providing an organic compound, which contains at least one functional group capable of reacting with the metal element of the precursor, reacting the precursor with the organic compound to provide a reaction product, and recovering the reaction product.

The coating composition is mainly comprised of the reaction product between a metal oxide precursor and an organic compound, which contains at least one functional group capable of reacting with the metal element of the precursor, the reaction product being obtained by the method of paragraph [0010] and being dissolved in a liquid and the method of forming a thin film by applying on the surface of the substrate a composition obtained by reacting a metal oxide precursor with an organic compound, which contains at least one functional group capable of reacting with the metal element of the precursor, to produce an intermediate product, which is dissolved in liquid phase and which can be polymerized, forming a thin layer on the surface, removing the solvent of the solution, and polymerizing the intermediate product into a cross-linked film.

The present invention provides considerable advantages. Thus, high refractive index and high dielectric constant coatings and structures can be fabricated at relatively low temperatures (e.g. 150° C. and above), which enables their use on various substrates, even on plastic and paper.

The material can be easily processed with various patterning methods. The invention makes it possible to process metal-oxide films from aqueous solutions. Materials are obtained that can be cross-linked by UV via the attached organic moieties.

Next, the invention will be examined in more closely with the aid of the attached drawings and the following detailed description.

BRIEF DESCRIPTION OF THE DRAWINGS

The patent or application file contains at least two drawings executed in color. Copies of this patent or patent application publication with color drawing(s) will be provided by the Office upon request and payment of the necessary fee.

FIG. 3a shows a 3D image of the film treated at 150° C., and FIG. 3b shows a 3D image of the film treated at 350° C.;

DETAILED DESCRIPTION OF THE INVENTION

Figure 1:
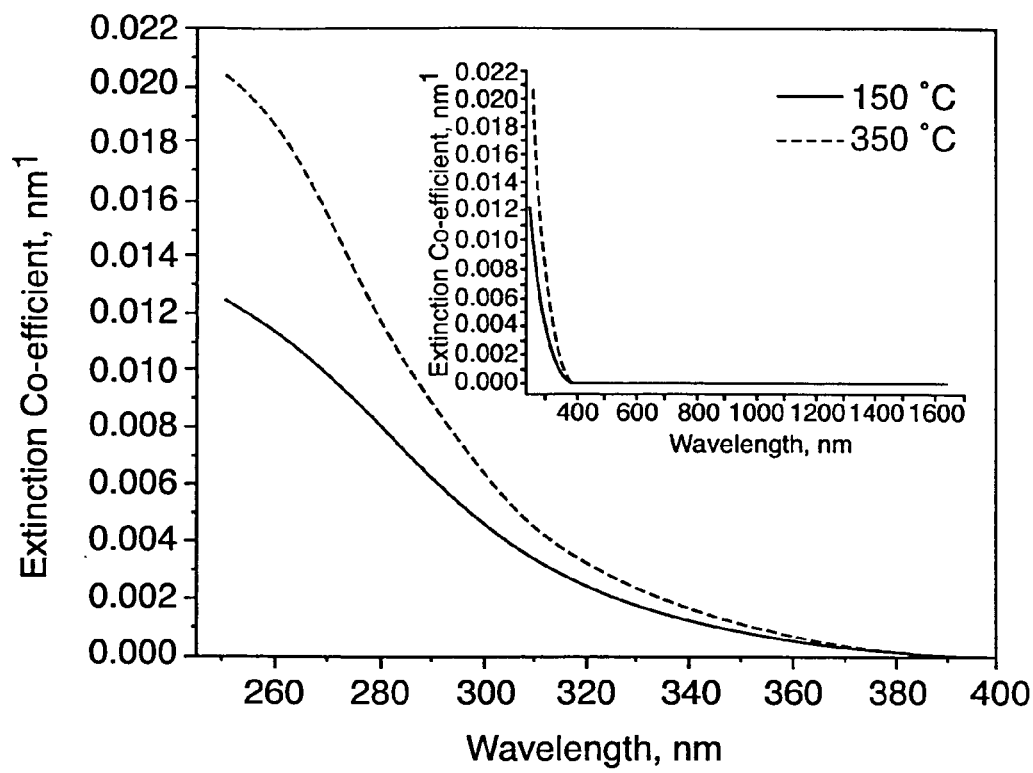
FIG. 1 depicts diagrammatically the extinction co-efficiency of titanium oxide films annealed at 150° C. and 350° C.

As discussed above, it is an object of the invention to provide a synthesis and fabrication method for high quality, high refractive index and high dielectric constant hybrid metal oxide materials, coatings and structures.

The method according to the invention typically comprises the steps of providing a precursor of the metal oxide material, containing a single metal element or a preformed precursor, which contains a combination of two or more metal elements;

providing an organic compound, which contains at least one functional group capable of reacting with the metal element of the precursor;

reacting the precursor with the organic compound, preferably in a liquid medium to provide a reaction product; and recovering the reaction product.

Within the scope of the present invention, the term "precursor" is used to designate any compound, which contains the metal of the metal oxide material in such a form that the metal atom is capable of reacting during the subsequent processing stages by forming a metal oxide network.

Typically, the precursor and the organic compound are mixed together in a liquid medium, or the precursor is dissolved in the organic compound, to provide a reaction mixture and the reaction is allowed to proceed in the reaction mixture for a reaction time of 0.1 to 24 hours. The reaction can be carried out in one step or as a multistep reaction. In the latter alternative, the reaction is, for example, first allowed to proceed for about 0.05 to 5 hours under intensive stirring. Then, the reaction mixture is allowed to stand for the remainder of the predetermined reaction time. The reaction temperature is usually ambient or elevated, preferably it is about of 10 to 80° C.

The reaction product comprises an intermediate product formed by the precursor, which is at least partially hydrolyzed, and the organic compound, which is bonded or coordinated to the precursor. Thus, the synthesis of the reaction product is based on hydrolysis and condensation chemistry synthesis technique; the precursor is preferably reacted with the organic compound in the presence of a sufficient amount of water to hydrolyze at least a part of the precursor.

According to a preferred embodiment, the reaction is carried out in aqueous phase, e.g. by mixing the precursor with the organic compound in water to form an aqueous solution. It is also possible to carry out the reaction in an organic solvent, which contains a sufficient amount of water. The organic solvent can comprise the organic compound used for forming the reaction product. Optionally, an excess of the organic compound is then used. The amount of water is typically at least 4-fold, preferably at least a 10-fold, compared to the equivalent amount based on hydrolysable groups of the metal oxide precursor. The water needed for the hydrolysation can also be provided by crystallization water liberated from a metal salt.

In many cases, the metal oxide precursor is highly reactive towards water and it can be advantageous to dissolve or dilute the metal oxide precursor in an organic solvent to reduce reactivity before the precursor is contacted with the organic compound and/or water. Typical organic solvents which can reduce reactivity include chlorinated and fluorinated hydrocarbons, such as chloro-substituted alkanes (chloroform, dichloromethane and dichloroethane). Also toluene and xylene can be usedas solvent.

The intermediate product is capable of polymerizing to form a film. In particular, the intermediate product is capable of polymerizing under the influence of heat and optionally evaporation of solvent. Other ways of polymerizing the intermediate product (prepolymer) include the use of radiation and photoinitiators. Also thermal initiators can be used.

Thus, the intermediate product is capable of polymerizing to form a cross-linked polymer having a (weight average) molecular weight in excess of 5,000 g/mol and up to 250,000 g/mol. Typically, the reaction product therefore comprises a prepolymer having a (weight average) molecular weight of 200 to 5000 g/mol.

According to the present invention, the metal oxide precursor preferably comprises a metal halogenide having the formula I $$MeX_m, \qquad \qquad I$$

wherein Me stands for a metal, X stands for a halogenide and m represents the valence of the metal, or a metal alkoxide, having the formula II $$MeOR^1{}_m \qquad \qquad II$$

wherein $R^1$ stands for a linear or branched, aliphatic or alicyclic alkyl group, which optionally is substituted by 1 to 3 substitutents selected from the group consisting of hydroxy, carboxy, anhydride, oxo, nitro and amido groups, and Me and m have the same meaning as above.

Me is preferably selected from the group consisting of germanium, titanium, tin, antimony, tantalum, hafnium, zirconium and silicon. X is preferably a chloride. Any alkoxide is suitable, but preferably methoxides or ethoxides are used due to their reactivity.

The metal oxide precursor may comprise one single metal oxide precursor or it can comprise two or more metal halogenides of the formula I or metal alkoxides having the formula II, having different metal elements Me. In the latter alternative, the metal oxide precursor comprises, for example, a second metal oxide precursor having the formulas I or II, wherein the metal stands for lanthanum, indium or lead. Naturally, mixtures of metal oxide halogenides/alkoxides of the above groups of germanium, titanium, tin, antimony, tantalum, hafnium, zirconium and silicon can also be employed. The metal oxide precursor may also comprises a metal halogenide or metal alkoxide, which in itself contains two different metal atoms.

Furthermore, the metal oxide precursor may comprise a second metal oxide precursor containing nitride or silicide groups.

According to the invention, the organic compound is capable of stabilizing the metal oxide precursor to the extent that it does not form a fully cross-linked polymer matrix, which would not be solvable in an aqueous or organic solvent. In general, the organic compound needs to be reactive with the metal element used in the synthesis and to be able to stabilize the metal oxide precursors so that they do not form a fully cross-linked "jelly" type polymer matrix, which is not soluble in aqueous or organic solvents. Within the scope of the present invention, the term "reactive" means that the organic compound is capable of forming a chemical compound or a chemical complex with the metal oxide precursor. For that purpose, the organic compound should have at least one, preferably 1 to 3, functional groups capable of reacting with the metal oxide precursor. Examples of such groups are carboxy, carboxylic anhydride, oxo, amide and nitro groups. A further feature is that the organic compound may contain groups, which can induce cross-linking reactions during an annealing or polymerization stage. For example, the organic compound may contain carbon—carbon double bonds.

In the below example, methacrylic acid is used, but the invention is not limited to such stabilizing and complexing organic compounds. Preferably, the organic compound can be any organic compound selected from the group consisting of organic acids, acid anhydrides, alkoxides, ketones, beta-diketones, acetyl acetones, benzyl acetones, aryl oxides, beta-keto-esters, alkanol amines, glygols, oximes, alkyl hydroxyl amines, beta-keto-amines, Shiff-bases, thiols and aldehydes. Therefore, examples of suitable organic compounds include, but are not limited to, acetic acid, acrylic acid, metacrylic acid, trifluoroacetic acid. Further examples are formed by ketones, such as acetone, and beta-diketone, and aldehydes.

During the reaction, the molar ratio between the metal oxide precursor and the organic compound is about 10:1 . . . 1:10, preferably about 5:1 to 1:5. Suitably, the molar amount of the organic compound is at least equal to the valences of the metal in the metal oxide precursor.

After the reaction, the reaction product is recovered. Since it is generally soluble in the reaction medium, it is recovered in solution, e.g. in an aqueous solution. It can also be recovered in the solution formed by an organic solvent and then dissolved into an aqueous phase by solvent displacement. It is also possible to recover the reaction product in aqueous solution and dissolve it into an organic solvent having a boiling point higher than water by solvent displacement. As an example of such a solvent, cyclic ethers, such as gamma butyrolactone, can be mentioned. Furthermore, solvent mixtures can be used as processing solvent.

As evident from the above, a coating composition according to the present invention comprises the reaction product between a metal oxide precursor and an organic compound an organic compound, which contains at least one functional group capable of reacting with the metal element of the precursor. The coating composition contains about 0.001 to 10 moles/l of the reaction product. Generally, the concentration of the reaction product in the liquid composition is about 0.1 to 60 wt-%, in particular about 5 to 50 wt-%. It is also possible to evaporate off the solvent/liquid of the recovered product to obtain an dry or semi-dry product, which can be dissolved in a solvent suitable for the subsequent film forming processing step.

The solution obtained (either aqueous or in an organic solvent) can be used as such for deposition by, e.g. liquid phase spin-on deposition, dip-coating, spray coating, menicus coating, gravure and/or flexographic coating.

The film-forming method comprises the steps of
applying on the surface of the substrate a coating composition,
forming a thin layer on the surface;
removing the solvent of the solution; and
polymerizing the intermediate product into a solid film.
The substrate is typically selected from the group of glass, plastics, paper, ceramics and laminates.

Generally, the reaction product can be processed to from liquid phase to result in film thicknesses ranging from 1 nm to 1000 nm with single deposition run. If high processing temperatures are required film thickness is preferably below 500 nm to prevent film failure due cracking.

The concentration of the composition during application depends on the target thickness of the film. By diluting the composition, it becomes possible to form thinner films. Generally, a concentration of about 5 to 30 wt-% is preferred.

If thicker films are required with a single deposition run the amount and type of solvent in the material can be varied. Furthermore, the aqueous solvent can be replaced with a suitable organic solvent, if necessary. For example, gamma-butyrolactone is a suitable solvent to be used with the present metal oxide hybrid polymers. Gamma butyrolactone can be used by itself or as a mixture with water.

By varying the amount of processing solvent it is possible, e.g., to fabricate titanium oxide hybrid polymer film in excess of 1000 nm in thickness. However, if high processing temperatures (350° C. or higher) are required, the achievable film thickness is in the range of 300 to 600 nm with single spin process. If various deposition runs are made, thicker films can be achieved.

A thin film layer thus formed can be annealed at low temperatures to result in high refractive index and high dielectric constant coatings. Thus, to mention an example, for titanium oxide hybrid materials, a refractive index of 1.94 (typically 1.9 or higher) can be achieved at a temperature of 150° C., and when the temperature is increases to 350° C., a refractive index of 2.03 (typically 2.0 or higher) can be achieved.

Generally, when the thin layer is annealed at a temperature in the range of 80 to 350° C. a metal oxide film is produced, which contains at least some residues of the organic compound.

However, when the organic compound contains radiation sensitive carbon double bonds polymerization of the intermediate product can also be carried out photo-crosslinking, as discussed above.

Depending on the application the formed film can also be annealed at very high temperatures (500 to 1000° C. or higher) to fully remove the organic compound (e.g. methacrylic acid) from the film leading to formation of a metal oxide thin film.

The hybrid metal oxide materials described herein can be patterned using UV-lithography, embossing, hot-embossing, UV-embossing, flash and print, nano-imprinting, roll-to-roll printing and gravure printing.

Since the materials can be cured at low temperature during the processing the use of various substrates types, such as plastics and paper, is possible.

The various applications of the invention will be examined below. Summarizing, it can here be noted that the present coating (film-forming) compositions according to the invention can be used for forming an optical or electrical thin film coating on a substrate, for forming a high refractive index film on top of a grating structure, for forming a high dielectric constant film (k value in excess of 3.9), for forming anti-reflection coatings, for forming a chemical and dry etching stop layer in lithographic processing, for forming a protective coating in an organic light emitting device, and for forming an efficiency enhancing layer in a solar cell. Further, the invention can be used for forming a high index material in an optical thin film filter and for forming an optical diffractive grating and a hybrid thin film diffractive grating by embossing, holography lithography and nano-imprinting of the thin film.

The present materials also form excellent high refractive index abrasion resistant coatings.

The following non-limiting example discloses the preparation of the new coating compositions:

Titanium Hybrid Polymer

Synthesis:

The liquid phase material for hybrid titanium oxide films was synthesized by using hydrolysis and condensation chemistry for titanium chloride precursors. Thus, 0.4 mol of titanium tetrachloride was stabilized and complexed with 0.1 mol of methacrylic acid.

The solution was hydrolyzed with a 10-fold molar excess (in respect to the chloride ions bonded to titanium) of ultra pure water, containing less than 10 ppm of impurities, with dichloromethane as an organic solvent reservoir and reaction stabilizer. The solution was allowed to react for 2 hours under vigorous stirring and in addition the solution was allowed stand still additional 12 hours without stirring. Finally, the aqueous phase was extracted from the solvent by an extraction funnel resulting in a stable aqueous liquid form material that was ready for spin-on deposition.

Processing (Example of Spin-on Deposition):

For testing purposes above-mentioned titanium oxide hybrid polymer were used as an optical thin film and thus the films were deposited on p-type 4" and 6" silicon substrates by applying spin-on processing method. The solution was poured on a static substrate after which the material was spun-on the wafer in two stages: first the solution was spread on the substrate with 300 rpm speed for 5 seconds and then the speed was accelerated in 2 seconds to 2000 rpm and allowed spin for 30 seconds. Edge bead removal (5 mm removal from the wafer edge) and backside rinse were accomplished manually using 2-propanol as a rinsing solvent. The film annealing was done with conventional open-air laboratory hot plate with ±2° C. temperature uniformity over the plate. Initial film pre-bake was done at 60° C. for 5 minutes. Then the film was taken through temperature sequenced annealing process (85° C., 105° C., 150° C., 200° C., 250° C. and 350° C.) each for 5 minutes. Between each step the film was cooled down and optical measurements were carried out using reflectometer. Moreover, two 6" silicon wafers were fabricated interchangeably at 150° C. and 350° C. annealing for spectrophotometry-based metrology characterization. Adhesion and wetting ability on a polypropylene plastic substrate was also tested wherein the wetting and the adhesion to a plastic type substrate was found be good. Finally, the films refractive index stability was tested with a "pressure cooking test" (120° C., ~2 atm for 2 hours), wherein no refractive index changes were not observed.

Film Characterization:

The film thickness, refractive index and extinction coefficient measurements were performed by using Filmetrics 20 reflectometer and SCI FilmTek 4000, which is a spectrophotometry-based metrology tool. The spectral optical data was acquired from 200 nm to 1700 nm. The surface-topography and rms surface roughness values of the deposited films were characterized with an optical non-contact surface profiler (WYKO NT-3300).

The synthesized material was very reactive against elevated temperature treatments. The films annealed at 105° C. for 5 minutes, resulted already as stable films that were resistant against common organic solvents as well as acidic and basic aqueous solutions without any changes in optical properties. In addition, the scratch resistance of the films annealed at 105° C. was excellent, although actual hardness values were not acquired. Adhesion on both substrates, i.e. polypropylene and p-type silicon, was also found to be good for 105° C. treated samples as they passed standard "Scotch tape test". Stability of 150° C. and 350° C. annealed films were tested with "pressure cooking test" where the samples are treated in 2 atm supercritical water pressure at 120° C. for two hours. The test indicated that the films annealed at 150° C. or less are not fully densified to withstand very aggressive environments, since the film's refractive index decreased more than 1% or $2.1 \times 10^{-2}$ at 632.8 nm wavelength. However, the film annealed at 350° C. showed good stability against the "pressure cooking test" and index change was in the order of $\pm 2 \times 10^{-4}$ at 632.8 nm.

Extinction co-efficient (k) showed slight increment as a function of annealing temperature as the film got more densified. At UV region (<400 nm) the extinction co-efficient increased rapidly by reaching the maximum value at the end of the measurement range (250 µm). The k values at 250 nm range were 0.0125 $nm^{-1}$ and 0.0215 $nm^{-1}$, respectively, for samples annealed at 150° C. and 350° C. Spectral extinction co-efficiencies are presented in FIG. 1. The k value saturated to "zero-level" in terms of measurement accuracy (approximately $1.0 \times 10^{-4}$) at 390 nm for both samples and no changes were obtained at visible and Near Infra-Red (NIR) regions up to 1700 nm (see insert in FIG. 1).

Figure 2:
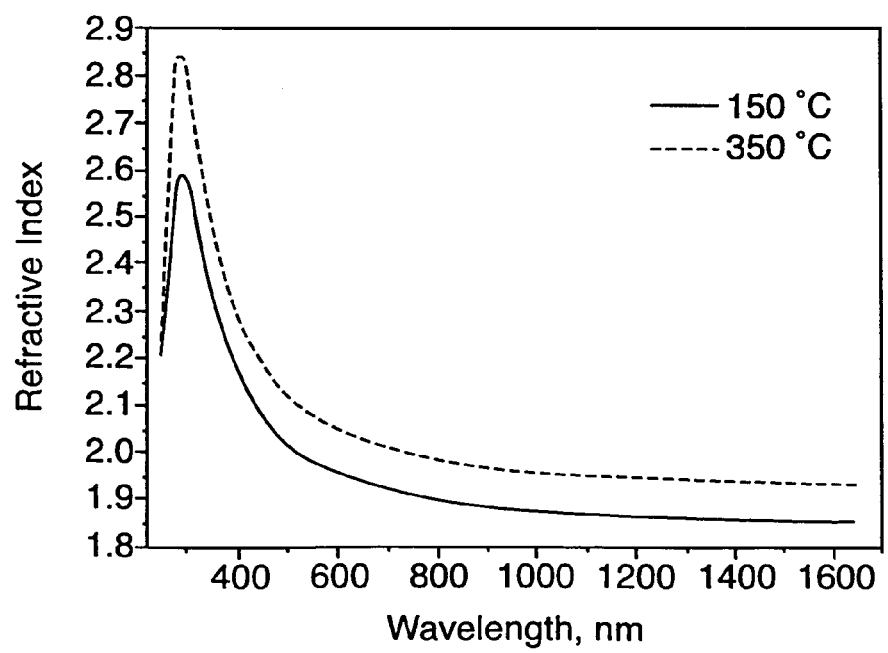
FIG. 2 depicts diagrammatically the refractive index of titanium oxide films as a function of wavelength for 150° C.°(solid) and 350° C.°(dashed) annealed films.

Spectral refractive indices between 250–1700 nm are shown in FIG. 2. The annealing temperature has an analogous effect on the refractive index of the films as on the extinction co-efficient values. Therefore higher refractive index was obtained for the sample treated at 350° C. Refractive index difference between the annealing temperatures was 0.0928 at 632.8 nm with corresponding values of 1.9407 and 2.0336 of 150° C. and 350° C. treated samples, respectively. The indices reached the maximum at 290 nm for the lower temperature sample and at 285 nm for the higher temperature sample, thereafter indices steadily decreased. The maximum values for 150° C. and 350° C. samples were respectively 2.5892 and 2.8464.

Figure 3A:
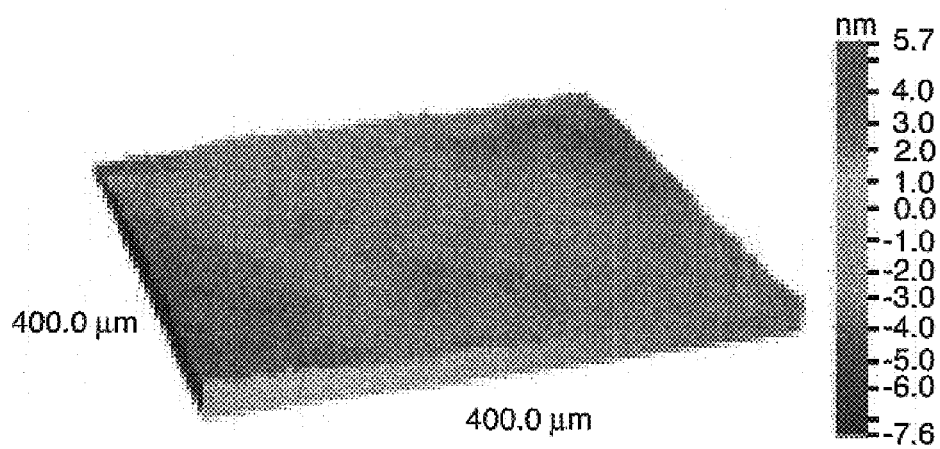
FIGS. 3a and 3b depicts the results of surface-topography measurements of deposited films, whereat
Figure 3B:
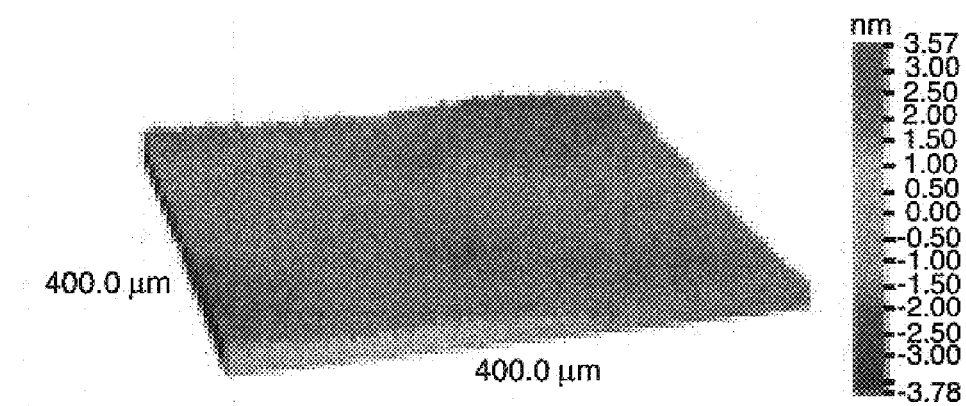

The achieved film uniformity was better than 0.5% and 0.9% (five points measured over the wafer) on a 4" and 6" silicon wafers, respectively. The film uniformities are comparable to standard chemical vapor deposition or physical deposition based thin film processing techniques. The film treated at 150° C. resulted in a rms surface roughness of 1.43 µm within a 400 µm×400 µm rectangular region, after tilt removal from the surface (see FIG. 3a). The film treated at 350° C. resulted in a rms surface roughness of 0.97 nm within a 400 µm×400 µm rectangular region, after tilt removal from the surface (see FIG. 3b).

Some film shrinkage was noticed between the films baked at 60° C. and films annealed at 350° C. The shrinkage of almost 50% for 350° C. annealed films can be explained by hydroxyl and methacrylic acid group condensation/cleavage reactions and evaporation of water solvent (a part which was not removed in the extraction) removal during the annealing at elevated temperature. The same reactions are also reasons for a surface reflow and sintering, which resulted in better surface smoothness for the high temperature annealed film. The effect of the shrinkage was also seen as relatively high birefringence of the films that is formed through stresses in the films. The optical birefringence for 150° C. and 350° C. were $1\times10^{-3}$ and $9\times10^{-3}$, respectively. The film thicknesses as a function of temperature are presented in Table 1. Table 1 presents also refractive indices for corresponding processing temperatures.

TABLE 1

Refractive indices (at 633 nm) of the film at various processing temperatures and corresponding film thicknesses based on reflectomer measurements.

| Annealing Temperature (° C.) | Film Thickness (nm) | Refractive Index at 633 nm |
|---|---|---|
| 60 | 140 | 1.72 |
| 85 | 106 | 1.81 |
| 105 | 95 | 1.87 |
| 150 | 91 | 1.94 |
| 200 | 85 | 1.97 |
| 250 | 77 | 1.99 |
| 350 | 73 | 2.03 |

The 350° C. anneal film was also tested by mercury-probe method for dielectric constant and the value was found be 72.

Alternative Materials and Processing Methods

As mentioned above, other metal salts (in addition to titanium tetrachloride) and/or alkoxides precursors can be used in the synthesis of these hybrid materials. Furthermore, it is also possible to choose other organic (in addition to methacrylic acid) precursors to carry out the synthesis and modify the properties of the resulting hybrid materials.

For example, using tin tetrachloride as a metal precursor molecule a very similar optical film forming behavior was observed: 0.1 mol of tin (IV) chloride was reacted using the above described synthesis method with 0.1 mol of methacrylic acid. The synthesized tin oxide hybrid polymer was deposited from aqueous phase using spin coating (3000 rpm, 30 s). The film was annealed at 200° C. for 4 hours. The film resulted in a thickness of 85 nm with refractive index approximately of 2.0 at 632.8 nm range. These films are also electrically conductive in some extent and optical properties and conductivity can be tuned via codoping the matrix with an other metal oxide component, such as antimony oxide.

As described above these materials can be used as optical or electrical coatings but also patterned for example using lithography, embossing, roll-to-roll printing and gravure printing. More specifically the material wherein carbon double bonds exists can be exposed to UV or deep-UV light and thus carbon double bond reacts and cross-links and making the exposed parts non-dissolvable to an organic solvent (developer such as isopropanol). Therefore, the material is behaving as a negative type resist in the lithographic process.

Potential Applications for the Materials

As briefly discussed above, the present materials have a great number of interesting new applications. Examples include:

A. Optical and electrical coatings
B. High dielectric constant (high-k) gate oxides and interlayer high-k dielectrics
C. ARC (anti-reflection) coatings
D. Etch and CMP stop layers
E. Protection and sealing (OLED etc.)
F. Organic solar cells
G. Optical thin film filters
H. Optical diffractive gratings and hybrid thin film diffractive grating structures
I. High refractive index abrasion resistant coatings These applications will be examined in more detail with reference to the attached drawings. In the drawings, reference numerals 100, 200, 300, 400, 500, 525, 600, 800 and 900 are used to designate various substrates.

Lithographic Processing Example

Negative Photolithography Process:

When the metal oxide precursor is modified with an organic moiety that contains radiation sensitive carbon double bonds, such as acrylates, the material can be polymerised by photo-crosslinking the organic compounds.

Figure 4:
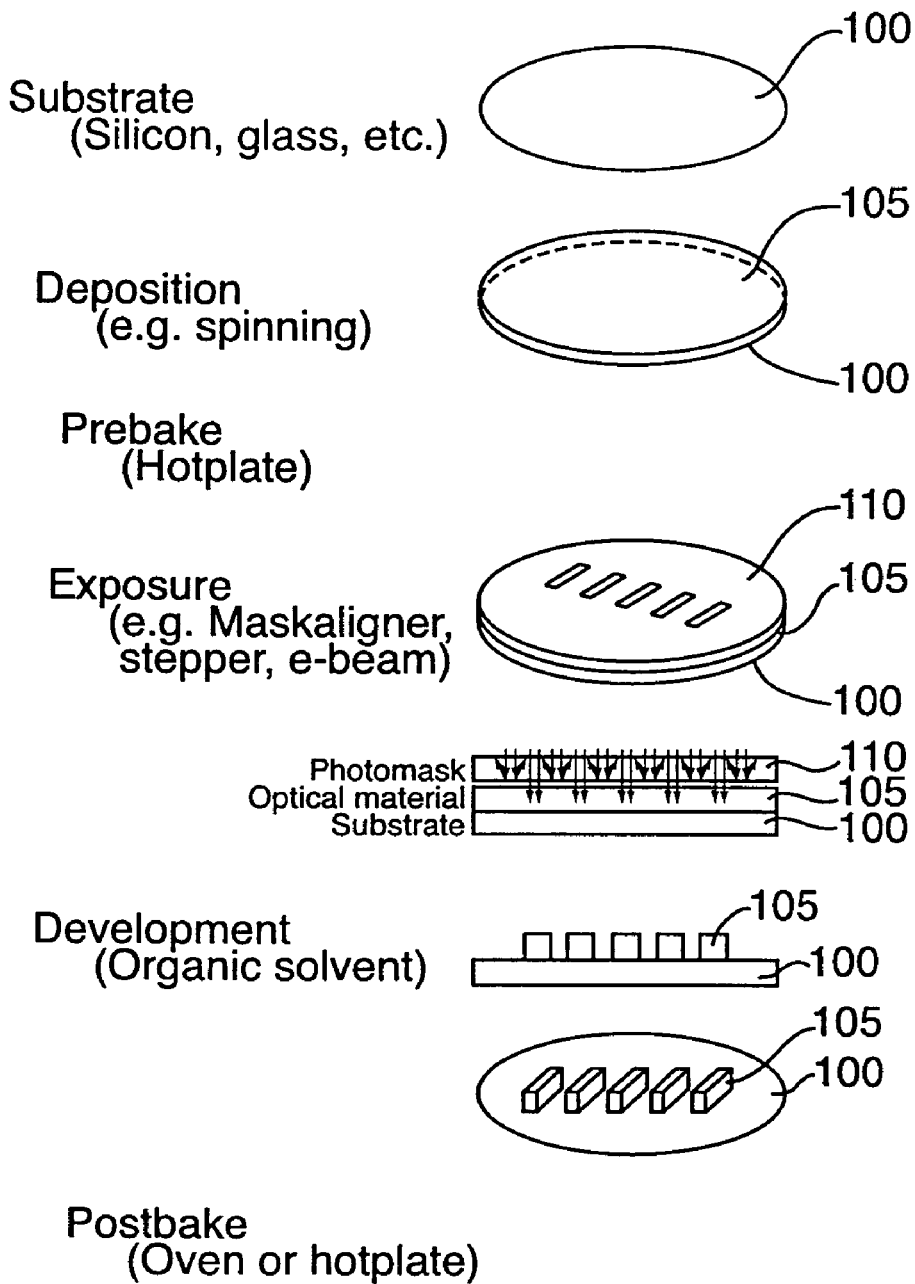
FIG. 4 shows in a schematical fashion the various steps of lithographic processing of negative tone materials.

FIG. 4 shows the various steps of a typical lithographic processing of negative tone materials.

On a substrate (wafer) 100, a thin film layer 105 forming an optical can be deposited by spin-on processing. A photomask 110 is then alligned/placed on the thin film surface. The photomask layer is provided with apertures for exposing the thin film layer to polymerisation typically carried out with high intensity radiation, such as ultraviolet (UV), Deep UV or e-beam radiation, prior the final formation of continuous metal-oxide backbone "Exposure" in FIG. 1). Thus, optical and opto-electronic structures 105 are produced into the material via a photo-mask 110 in a single lithography-step directly on the wafer surface without the need of any complex masking (typically carried with photo-resist) and etching steps.

The unexposed regions are thereafter removed during a chemical development step ("Development" in FIG. 1), since those regions are more solvable to a developer than the exposed photo-polymerised regions. Therefore, it can be stated that the material functions as a negative tone material.

Typical developer chemicals in the development step include organic solvents such as 2-propanol, acetone, methyl isobutyl ketone or diluted acids and bases or even various combinations of the previous compounds. After the development, the processing of the patterned structures are typically finalised with by annealing the sample at elevated temperatures ("Postbake" in FIG. 1). This annealing process may included a "burn-off" of the previously formed organic polymer matrix if the anneal temperature is higher than the decomposition temperature of the organic polymer compounds. This "burn-off" anneal is preferable to be executed in oxygen containing atmosphere so that fully stoichiometric metal-oxide matrix can be formed. However, other oxidative gasses can also be applied, such as $N_2O$, CO and $CO_2$.

A. Optical and Electrical Coatings:

Based on the above, films produced from the present compositions can be used as optical or electrical thin coatings 105 on various substrate surfaces, such as glass, silicon, plastics, ceramics and laminates (such as printed circuit board materials e.g. FR4). The films have optical functionalities, such as properties of anti-reflection and relative high absorption in the UV and DUV wavelength ranges (i.e. below 400 nm), and/or have thermal and/or electrical functionalities, such as thermal or electrical conductivity, high dielectric breakdown strength and high dielectric constant and combinations thereof. With certain metal oxide compositions the materials are also conductive. This is the case in particular when tin (Sn) is used to form the metal oxide matrix.

Coating film thicknesses can be varied from 1 nm to 2.0 μm depending on the material composition, dilution ratio and deposition method and processing temperature.

When the material is synthesized it contains metal oxide as well as organic functionality. Depending on the processing temperature the film may be amorphous or crystalline. At low processing temperatures the organic functionality remains in the material and the film of amorphous. When the anneal temperature is increased (above about 300 to 350° C., the organic residues are burnt off from the material film and only the metal dioxide remains in the film, but the material still remains amorphous. When the anneal temperature is further increased (typically above 600° C.), the material starts to crystallize and forms crystalline structure characteristic for the metal oxide used in the synthesis.

The material can also be used as a high refractive index over-coating on top of an optical topography, such as on a grating structure, to enhance the diffraction properties of the grating. Furthermore, the film can be used as a planar light-guide (i.e. two dimensional waveguide) or patterned light-guide (i.e. channel waveguide).

The advantage of using a high refractive index material in combination with lower index materials in light-guide components is that the dimensions of the component can be dramatically decreased and very high bending radiuses can be used due to the high refractive index difference between the high index light-guide and the surrounding cladding materials.

Due to the fact that the materials can be coated or deposited from the liquid phase optical and electrical coatings can be formed on top of various shapes, such as on fibres or fibre tips as well as on flexible/bended surfaces, such as plastic foils.

B. High Dielectric Constant (High-k) Material

To build next-generation transistors, it is advantageous to work with materials that can replace the silicon dioxide gate dielectric wherein continued thinning makes it increasingly difficult to control current leakage. This thicker class of materials, known as "high-k," will replace commonly used silicon dioxide technology in high performance devices. "High-k" stands for high dielectric constant, which is a measure of how much charge a material can hold. Different materials similarly have different ability to hold charge. Air is the reference point for this constant and has a "k" value of 1. High-k materials, such as hafnium dioxide ($HfO_2$), zirconium dioxide ($ZrO_2$) and titanium dioxide ($TiO_2$) inherently have a dielectric constant or "k" above 3.9, the k of silicon dioxide. The dielectric constant also relates directly to transistor performance. The higher the k, the greater the transistor capacitance, which means that the transistor can properly switch between and "on" and "off" states, and have very low current in the "off" state and yet a very high current when it is turned on. Typically, the thicknesses of these high-k materials vary in the range from about a few nanometers to about 10 nm, whereas if silicon dioxide used the thickness needs to be as thin as 1 nm at 90 nm technology node size which is obviously difficult to process and control.

By using materials provided by the present invention, high-k materials can be applied in a simple manner on various surfaces and topographies at advantageously low processing temperatures as well as patterned simply through direct lithographic patterning.

Conventionally, k-high materials are processed with CVD (Chemical Vapor Deposition) and ALD (Atomic Layer Deposition), which require expensive equipment as well as complex masking and etching schemes.

C. ARC (Anti-Reflection) Coatings

Figure 5:
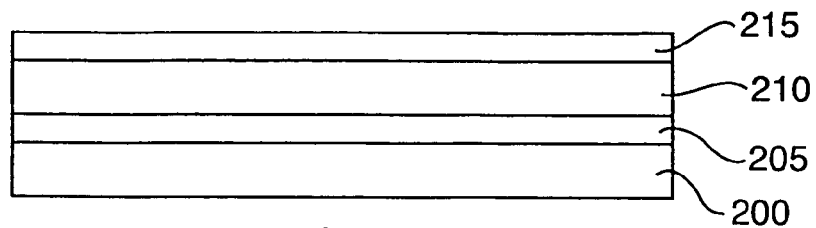
FIG. 5 shows in a sectional sideview a lithographic multilayered structure containing BARC or TARC layers formed by lithographic processing.
Figure 6:
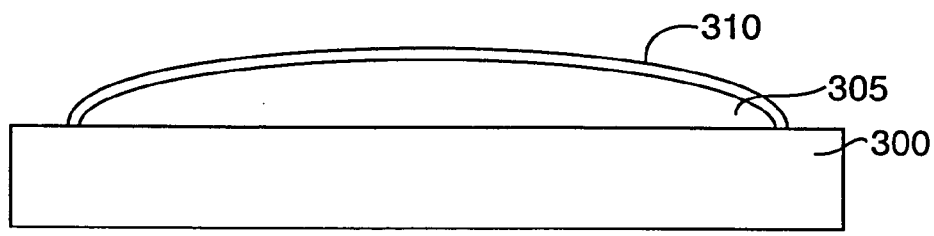
FIG. 6 shows in a sectional sideview the structure of an optical component with overlaying ARC layer(s)

FIGS. 5 and 6 show the use of the present materials in the form of thin films as anti-reflection coating (ARC) layers during processing and on top of finished device structures. More specifically, FIG. 5 shows how the materials can be applied as BARC and TARC layers during lithographic processing, and FIG. 6 how the materials are applied as ARC layer(s) on optical component surfaces.

Thus, the material can be applied as bottom antireflection layers 205 and/or as top antireflection layers 215 to be used in lithographic processing. Reference numeral 210 in FIG. 5 stands for a film of resist material.

The material can be used also on top 310 of optical structures 305 to function as antireflection coating layer. The processing can be tuned to result in desired film thickness. The ARC layer film 310 thickness has to be optimized for each structure and used wavelength separately.

D. Etch and CMP Stop Layers

The material can be also applied as a wet chemical and dry etching stop layer in lithographic processing. It can be also used in chemical mechanical polishing processing.

E. Protection and Sealing (OLED etc.)

Figure 7:
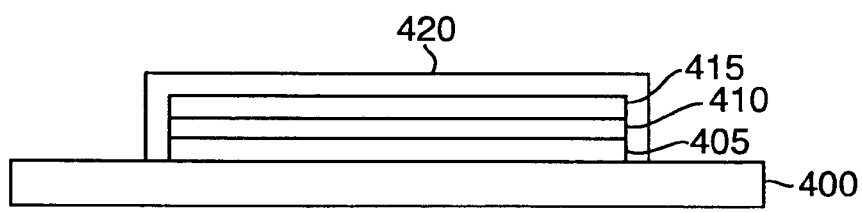
FIG. 7 shows in a sectional sideview an organic light emitting structure containing an overcoat/seal of the present material.

The material can be used as protective coating of e.g. Organic Light Emitting Devices. FIG. 7 shows how the material can be applied 420 to overcoat/seal organic light emitting devices comprising a three-layer structure with an anode layer 405, at least one organic layer 410 and a cathode layer 415, deposited on a substrate 400.

F. Organic Solar Cells and Active Windows

The novel material can be also used as an efficiency enhancement or solar energy activation layer 510 (cf. FIG. 8) for example in solar cells known as Titanium-Dye-Sensitized (TDS) cells.

Figure 8:
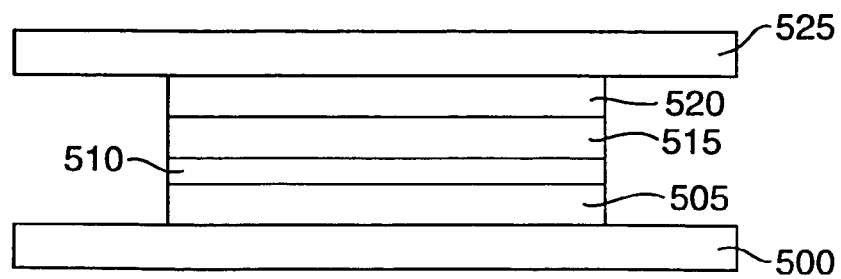
FIG. 8 shows in a sectional sideview of a multilayered solar cell, containing a material layer formed as an efficiency-enhancing layer between the anode and organic material of the cell.

TDS cells use 2 transparent sheets of glass 500, 525 with conductive coatings and an electrolyte 505, 510, 515, 520 sandwiched inbetween, thus allowing them to be used as a window type solar panel. Reference numeral 505 stands for an anode layer, 515 for organic layer(s) and 520 for a cathode layer. FIG. 8 shows how the material can be used as an efficiency enhancement layer 510 between the anode 505 and organic material 515.

TDSs are at present producing electricity commercially at about 10% efficiency and produce about 50 watts per square meter. When used as a window, they have the potential of being able to reduce the heat gain into a building and also provide power to it. Part of the attractiveness of this type of cell is the potentially low cost thereof and the relatively simple construction. It has an anatase crystalline structure, and it is white to semi-transparent. The electrodes and the exposure to light are provided by a glass sheet sandwich with conductive coatings. The titanium dioxide is treated with a synthetic ruthenium bipyridyl based dye on the incoming light surface and works in conjunction with an electrolyte of iodide/triiodide to the other conductive surface to produce a voltage potential. The "back" layer has a catalyst coating, such as carbon, on its $SnO_2$ layer. The photo-excited dye injects an electron through the $TiO_2$ layer, which is passed to the $SnO_2$ surface and out to the external circuit. The $SnO_2$ layer is conductive because of the existence of oxygen vacancies which act as donors. Within the iodide electrolyte it (iodide/triiodide) undergoes oxidation at the dye and regeneration at the catalyst coated $SnO_2$ electrode on the opposite side, thus maintaining an electrolyte balance and completing the circuit.

This type of solar cell will have superior performance particularly at lower light levels over the typical PV "semiconductor" types because it does not suffer from the electron-hole recombination in the semiconductor material, which seriously affects the efficiency of PV cells.

G. Optical Thin Film Filters

Figure 9:
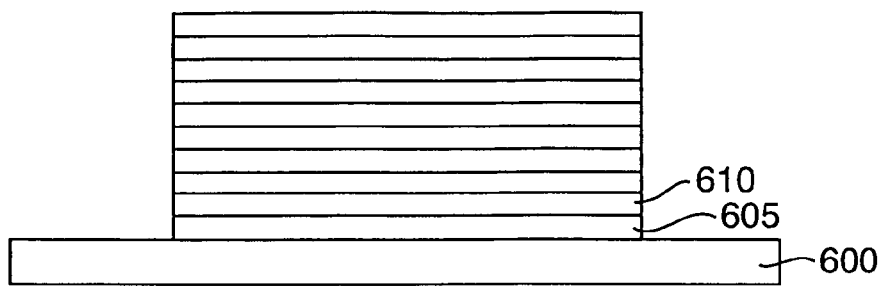
FIG. 9 depicts in sectional sideview an exemplifying embodiment of a thin film filter.

The materials can be applied in stack thin film filter structures. FIG. 9 shows example of a thin film filter. Two materials are needed for fabrication of a thin film filter: A high index material 605 (materials which can be produced according to the present invention) and a low index material 610 (e.g. $SiO_2$, methylsilsesquioxane and fluorinated polymers).

Figure 10A:
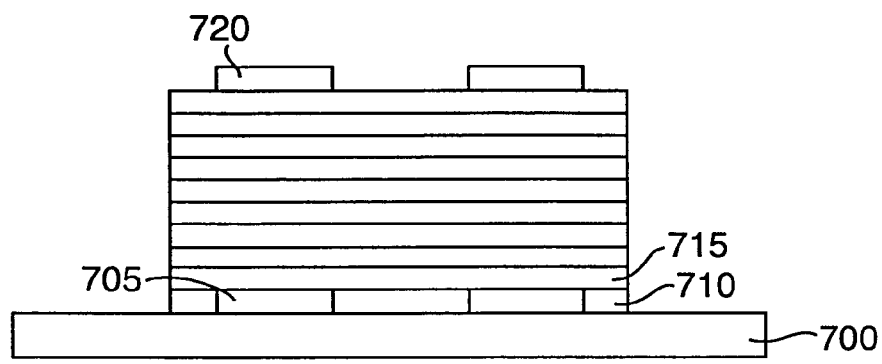
FIGS. 10a and 10b show in sectional sideview and top view, respectively, the structure of a stack filter.
Figure 10B:
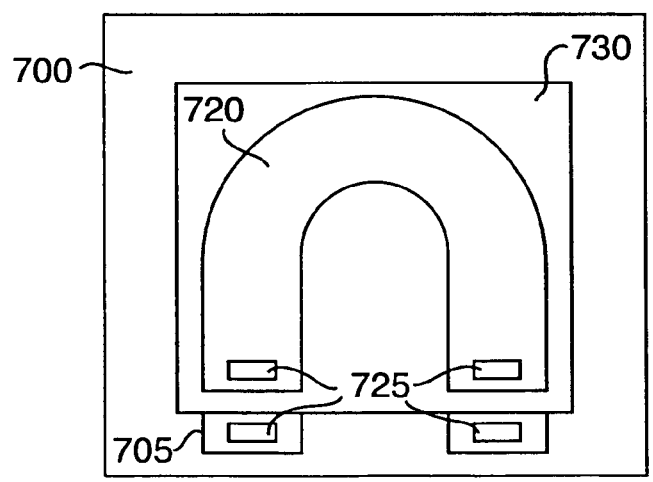

FIGS. 10a and 10b show how the stack filter can be tuned by heating it. In the figures, the following reference numerals are used:

| | |
|---|---|
| 600 | substrate |
| 605 | high index layer |
| 610 | low index layer |
| 700 | bottom electrode |
| 705 | top electrode |
| 710 | contact pads |

Figure 11:
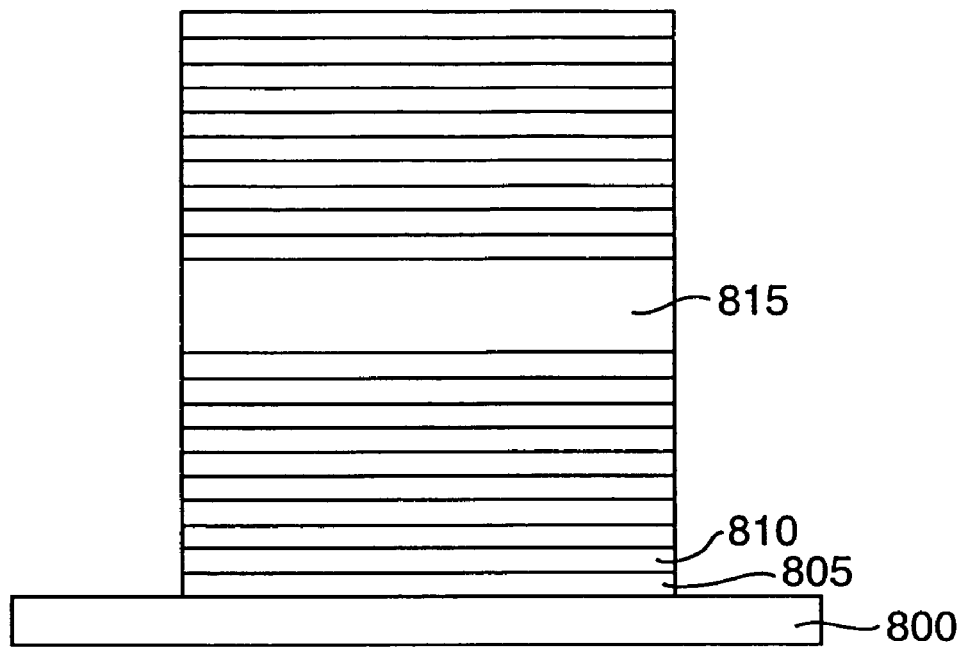
FIG. 11 shows in a sectional sideview the structure of an alternative embodiment of a thin film filter.

FIG. 11 shows another example where the thin film filter idea is applied. This construction can be made also thermally tunable like shown above in FIG. 10a and 10b. Reference numeral 805 depicts the high index layer according to the present invention, and numerals 810 and 815 stand for the low index layer and a thick material layer.

Figure 12:
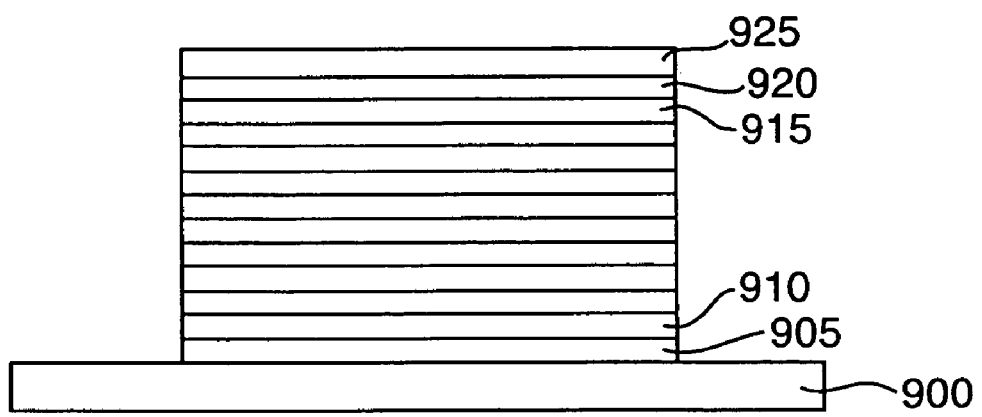
FIG. 12 shows in a sectional sideview the structure of a multilayered resonant cavity for an OLED.

FIG. 12 shows a resonant cavity for an OLED (cf. FIG. 8) comprising deposited on a substrate 900 a high index layer 905, a low index layer 910, an anode 915, an organic layer 920 and a reflective cathode 925.

H. Optical Diffractive Gratings and Hybrid Thin Film Diffractive Grating Structures Via Embossing, Holography Lithography and Nano-imprinting The coated, but not fully hardened, film can be patterned at very fine resolution by embossing (hot embossing and UV embossing are applicable), holography lithography or nano-imprinting. During embossing and nano-imprinting processing, the films are structured by pressing mechanically a patterned stamp or shim against the film surface, which results in replicated negative image of the stamp or shim to the film. The replicated structure is thereafter "frozen" by thermal and/or UV process while the mechanical stamp/shim is still in place or right after removing the mechanical stamp/shim. After the replication step is completed, additional treatments, such as solvent cleans, can be applied. For the purposes of holographic lithography patterning the film needs to contain photo-crosslinkable components that are reacted, i.e., cross-linked, in the course of the lithographic process. After the holographic lithography, use of additional chemical treatments is typically mandatory to remove unexposed areas of the film.

I. High Refractive Index Abrasion Resistant Coatings

A metal oxide backbone (such as Ti—O—Ti) generates very tough and hard film structure. On the other hand, the organic character of the materials described in this invention provides excellent adhesion to plastic surfaces. To achieve a property known as abrasion resistant behavior with thin films on relative weak plastic surfaces, hard, tough and good adherence is required. Also since the abrasion resistance films are typically deposited on thermally unstable substrate low processing and annealing temperatures are also required which is one of the key purposes with the uses described for the present invention. It is also preferable that the abrasion resistant film has a high refractive index so that it can be used as an anti-reflection coating and, simultaneously, as a protective film.

The invention claimed is:

1. Method of forming a thin film on top of a substrate, comprising the steps of:
    applying on the surface of the substrate a composition obtained by reacting a metal oxide precursor with an organic compound, which contains at least one functional group capable of reacting with the metal element of the precursor, to produce an intermediate product, which is dissolved in liquid phase solution using a solvent and which can be polymerized;
    forming a thin layer on the surface;
    removing the solvent of the solution; and
    polymerizing the intermediate product into a cross-linked film;
wherein the metal oxide precursor comprises a metal halogenide having the formula I $$MeX_m, \qquad \qquad I$$

wherein Me stands for a metal, X stands for a halogenide and m represents the valence of the metal; or
a metal alkoxide, having the formula II $$MeOR^1_m \qquad \qquad II$$

wherein $R^1$ stands for a linear or branched, aliphatic or alicyclic alkyl group, which optionally is substituted by 1 to 3 substitutents selected from the group consisting of hydroxy, carboxy, oxo, nitro and amido groups, and Me and m have the same meaning as above.

2. The method according to claim 1, wherein the intermediate product is processed from aqueous liquid phase.

3. The method according to claim 1, wherein the intermediate product is processed from liquid phase to produce a film having a thickness in the range from 1 nm to 1000 nm with single deposition run.

4. The method according to claim 3, wherein the intermediate product is processed at a temperature in excess of 500° C. to produce a film having a thickness below 500 nm to prevent film failure due to cracking.

5. The method according to claim 1, wherein the intermediate product is processed to give a high refractive index coating.

6. The method according to claim 1, wherein the thin layer is annealed at a temperature in the range of 80 to 350° C., to produce a metal oxide film which contains at least some residues of the organic compound.

7. The method according to claim 6, wherein the intermediate product is processed at a temperature of about 150° C. to give a film having a refractive index of at least 1.9, or wherein the intermediate product is processed at a temperature of about 350° to give a film having a refractive index of at least 2.0.

8. The method according to claim 1, wherein the organic compound contains radiation sensitive carbon double bonds to allow for polymerization of the intermediate product by photo-crosslinking.

9. The method according to claim 1, comprising forming a thin film on a substrate selected from a group consisting of glass, plastics, paper, ceramics and laminates.

10. The method according to claim 1, comprising forming an optical or electrical thin film coating on a substrate.

11. The method according to claim 10, wherein the thin film forms a high refractive index film on top of a grating structure.

12. The method according to claim 1, comprising forming a high dielectric constant film.

13. The method according to claim 1, comprising forming an anti-reflection coating.

14. The method according to claim 1, comprising forming a chemical and dry etching stop layer in lithographic processing.

15. The method according to claim 1, comprising forming a protective coating in an organic light emitting device.

16. The method according to claim 1, comprising forming an efficiency-enhancing layer in a solar cell.

17. The method according to claim 1, comprising forming a high index material in an optical thin film filter.

18. The method according to claim 1, comprising forming an optical diffractive grating and hybrid thin film diffractive grating by embossing, holography lithography and nanoimprinting of the thin film.

19. The method according to claim 1, comprising forming a high refractive index abrasion resistant coating.

20. The method according to claim 1, wherein the thin film is deposited on the substrate by spin-on deposition.

21. The method according to claim 1, wherein Me is selected from the group consisting of germanium, titanium, tin, antimony, tantalum, hafnium, zirconium and silicon.

22. The method according to claim 21, wherein the metal oxide precursor comprises a combination of metal halogenides having formula I and metal alkoxides having formual II.

23. The method according to claim 1, wherein the metal oxide precursor comprises at least two metal halogenides having the formula I or at least two metal alkoxides having the formula II, each of the at least two metal halogenides or at least two metal alkoxides having different metal elements Me.

24. The method according to claim 23, wherein one of the different metal elements lanthanum, indium or lead.

25. The method according to claim 1, wherein the metal alkoxide includes a methoxide, an ethoxide.

26. The method according to claim 1, wherein the metal oxide precursor comprises a second metal oxide precursor containing nitride or silicide groups.

27. The method according to claim 1, wherein the metal oxide precursor comprises a metal halogenide containing two different metal atoms or a metal alkoxide containing two different metal atoms.

28. The method according to claim 1, wherein the organic compound is capable of stabilizing the metal oxide precursor to the extent that it does not form a fully cross-linked polymer matrix, which would not be solvable in an aqueous or organic solvent.

29. The method according to claim 1, wherein the organic compound is an organic compound selected from the group consisting of organic acids, acid anhydrides, alkoxides, ketones, beta-diketones, acetyl acetones, benzyl acetones, aryl oxides, beta-keto-esters, alkanol amines, glygols, oximes, alkyl hydroxylamines, beta-keto-amines, Shiff-bases, thiols and aldehydes.

30. The method according to claim 29, wherein the organic compound contains carbon double bonds.

31. The method according to claim 30, wherein the organic compound is selected from the group consisting of acrylic acids, (alk)acrylic acids, acetic acid, trifluoro acetic acid and beta-diketone.

32. The method according to claim 1, wherein the molar ratio between the metal oxide precursor and the organic compound is about 10:1 to 1:10.

33. The method according to claim 32, wherein the molar ratio between the metal oxide precursor and the organic compound is about 5:1 to 1:5.

34. The method according to claim 1 wherein the at least one metal halogenide includes a halide.

35. The method according to claim 34 wherein the halide is chloride.

* * * * *

UNITED STATES PATENT AND TRADEMARK OFFICE
CERTIFICATE OF CORRECTION

PATENT NO. : 7,094,709 B2  Page 1 of 1
APPLICATION NO. : 10/868624
DATED : August 22, 2006
INVENTOR(S) : Kärkkäinen It is certified that error appears in the above-identified patent and that said Letters Patent is hereby corrected as shown below:

In column 16, claim 24, line 8, after the word "elements", please insert -- is --.

Signed and Sealed this

Fourteenth Day of November, 2006

JON W. DUDAS
*Director of the United States Patent and Trademark Office*